Feb. 15, 1944.    J. ZUBKO    2,342,029
METHOD OF AND MEANS FOR TESTING CONDUCTING MATERIALS BY COMPARISON
Filed Nov. 7, 1940

Patented Feb. 15, 1944

2,342,029

UNITED STATES PATENT OFFICE 2,342,029

METHOD OF AND MEANS FOR TESTING CONDUCTING MATERIALS BY COMPARISON

Jan Zubko, London, England

Application November 7, 1940, Serial No. 364,756
In Great Britain December 28, 1939

7 Claims. (Cl. 175—183)

It is well known that for measuring the temperatures involved in different processes, scientific workers use the effect observed by Seebeck that if a circuit is made consisting of two wires made of different conducting materials joined end to end, an electric current flows in the circuit if the two junctions of the wires are at different temperatures. If the wires were previously calibrated so that the electromotive force of the current corresponding to any temperature is known, then the difference in temperatures involved in different processes could be ascertained.

I have now conceived that it is possible to make use of the above effect for the detection of any difference in the composition of a material to be tested as compared with that of a standard piece of material. If, for instance, a large number of articles have to be manufactured of a certain composition of steel in order to have definite qualities depending upon their composition and it is of the utmost importance that every article should be of the specified composition, then it is desirable to be able to test every article to ensure that it is of the required composition. With present methods, however, the tests take too long, are costly and may result in the spoiling of the tested piece.

The method of testing according to this invention consists in connecting one end of a standard piece of the material to one end of a test piece electrically through a galvanometer, or like indicating instrument, forming a thermocouple by applying a heated piece of conducting material to the opposite ends of the standard and test pieces and observing the effect on the indicating instrument.

Apparatus for carrying out tests by the above method comprises means for mounting a standard piece and a test piece of the material, electric leads for connecting one end of each of said pieces with the other through a galvanometer or like indicating instrument, and means for mounting a heated piece of conducting material at the opposite ends of the said standard and test pieces, at least one of said means being movable towards and away from the other in such a manner that the heated piece can be moved into contact with the other pieces.

In order that this invention may be readily understood and carried into practice, a form of apparatus for carrying out the test is shown by way of example in the accompanying drawing in which—

For the purpose of this description it will be assumed that it is desired to test a large number of bolts in order to ascertain whether the finished bolt is of the desired composition. A piece may be cut out of the metal from which the bolts are made to form a standard piece marked $a$. One end of the standard piece $a$ is connected with the adjacent end of one of the bolts $b$ to be tested by the wire $c$ containing the galvanometer $d$. These parts are formed into a thermocouple by bringing the opposite ends of the standard and test pieces into contact with a bridge piece $e$ of good heat and electricity conducting material which is raised to the desired temperature, for example, by the resistance $f$ supplied with current from any suitable source not shown. The temperature of the bridge piece can be ascertained by including in it a thermopile or thermocouple $g$ connected by the wires $h$ to an indicating instrument for temperature measurement $i$. With this arrangement when the bridge piece $e$ is at the proper temperature it is contacted with the standard and test pieces $a$ and $b$. Then heat is supplied by conduction to these pieces and the circuit comprising the pieces, the wire $c$ and the galvanometer is closed. Now if both the standard and test pieces are of the same composition no electromotive force will be produced and there will be no deflection of the galvanometer needle, whereas if the said two pieces are of different composition a deflection of the galvanometer needle will be obtained.

The test can be repeated for each article by merely substituting the new article in place of that alrady tested and the article will not be in any way affected by the test.

Figure 1:
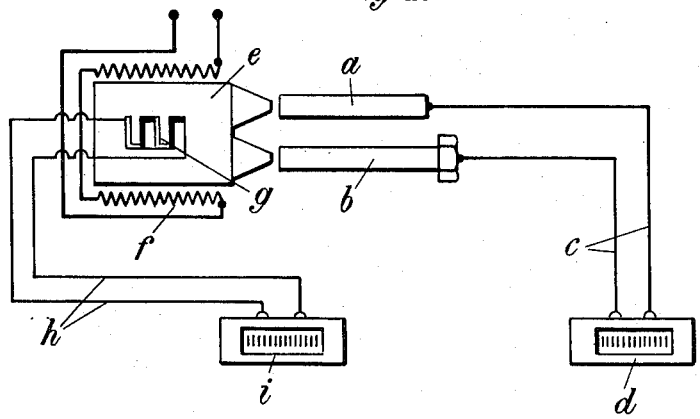
Figure 1 is a diagram of the electrical connections.
Figure 2:
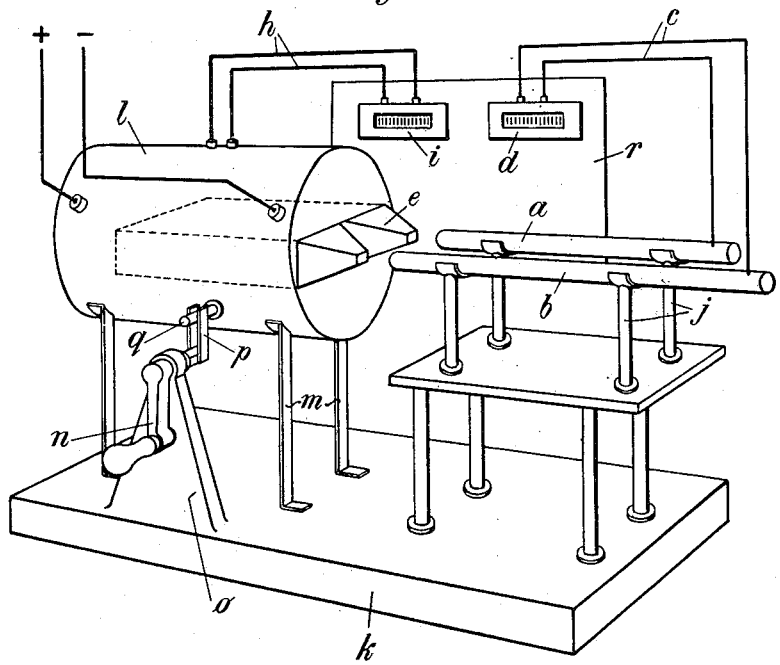
Figure 2 is a perspective view of the apparatus.

In Fig. 2 a form of apparatus is shown wherein like references indicate like parts to those in Fig. 1. The pieces $a$ and $b$ are mounted on fixed supports $j$ on a base $k$, while the bridge piece $e$ is built into a housing $l$ filled with heat insulating material, not shown, the whole forming a heater. This heater is conveniently mounted on four feet $m$ made of spring strips or other resilient material fixed to the base $k$. A hand crank $n$ mounted on the bracket $o$ has spring steel uprights $p$ engaging with a projection $q$ on the heater in such a manner that rotation of the hand crank $n$ rocks the heater to the right or left, the spring feet permitting the heater to move thereby into or out of contact with the standard or test pieces. The instruments $d$ and $i$ may be mounted on a rear board $r$.

In this example the heater $l$, $e$, is movable while the standard and test pieces are stationary, but the heater could be made stationary and the supports *j* for the standard and test pieces made movable, or both the heater and supports could be so made as to be movable towards and away from each other.

The result of the test may depend upon the pressure of the heater against the standard and test pieces so the spring uprights *p* are provided between the hand crank *n* and the heater for transmitting movement of the hand crank to the heater in order to permit variation of the applied pressure. Any equivalent means may be used for permitting the pressure of the heater against the standard and test pieces to be increased as desired.

What I claim as my invention and desire to secure by Letters Patent is:

1. A method of testing by comparison pieces of an electrically and thermally conducting material, which consists in connecting one end of the test piece and of a standard piece of the material electrically through a current indicating device, forming a thermocouple by applying a heated part of conducting material to the opposite ends of the two pieces and observing the effect on the indicating device.

2. A method of testing by comparison a piece of an electrically and thermally conducting material against a standard piece of the material, which consists in forming a thermocouple of the two pieces, by connecting similar extremities of the pieces electrically through a current indicating device and applying momentarily a preheated conductor member to the opposed extremities of said pieces and observing whether or not current flows through the thermocouple.

3. Apparatus for testing pieces of electrically and thermally conducting material against a standard piece, comprising in combination mountings for the two pieces, a current indicating device, electric leads connecting one end of each of said pieces with the current indicating device, means adjacent the opposite ends of said pieces for supporting a heated piece of conducting material, and means for approaching said mountings and said supporting means to bring the heated piece and the pieces supported by the mountings into contact.

4. Apparatus for testing pieces of electrically and thermally conducting material against a standard piece, comprising in combination mountings for the two pieces, a current indicating device, electric leads connecting one end of each of said pieces with the current indicating device, a heater for supporting a piece of conducting material, and means for approaching the heater and the mountings aforesaid to bring the heated piece and the pieces supported by the mountings into contact.

5. Apparatus for testing pieces of electrically and thermally conducting material against a standard piece, comprising in combination mountings for the two pieces, a current indicating device, electric leads connecting one end of each of said pieces with the current indicating device, a heater for supporting a piece of conducting material, and spring feet supporting the heater so as to enable it to be moved towards the mountings to bring the heated piece into contact with the pieces supported by the mountings.

6. Apparatus as claimed in claim 3, including means for varying the contact pressure of the heated piece and the pieces supported by the mountings.

7. Apparatus for testing pieces of electrically and thermally conducting material against a standard piece, comprising in combination mountings for the two pieces, a current indicating device, electric leads connecting one end of each of said pieces with the current indicating device, a heater for supporting a piece of conducting material, spring feet supporting the heater, and a crank handle mounted on a fixed support and operatively connected to the heater so as to move the latter against the action of the spring feet into position to bring the heated piece into contact with the pieces supported by the mountings.

JAN ZUBKO.